(12) United States Patent
Wu et al.

(10) Patent No.: US 8,908,788 B2
(45) Date of Patent: Dec. 9, 2014

(54) METHOD AND DEVICE FOR SELECTING ANTENNAS AT THE BASE STATION

(75) Inventors: Keying Wu, Shanghai (CN); Dong Li, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/520,743

(22) PCT Filed: Dec. 31, 2010

(86) PCT No.: PCT/CN2010/080665
§ 371 (c)(1),
(2), (4) Date: Jul. 5, 2012

(87) PCT Pub. No.: WO2011/082654
PCT Pub. Date: Jul. 14, 2011

(65) Prior Publication Data
US 2012/0275531 A1    Nov. 1, 2012

(30) Foreign Application Priority Data
Jan. 8, 2010  (CN) .......................... 2010 1 0022593

(51) Int. Cl.
*H04B 7/02* (2006.01)
*H04B 7/06* (2006.01)
*H04B 7/04* (2006.01)
*H04B 7/10* (2006.01)

(52) U.S. Cl.
CPC ............ *H04B 7/0691* (2013.01); *H04B 7/0689* (2013.01); *H04B 7/10* (2013.01); *H04B 7/0413* (2013.01)
USPC ........... 375/267; 375/299; 375/347; 375/358; 455/64; 455/69; 455/101

(58) Field of Classification Search
None
See application file for complete search history.

(56) References Cited

U.S. PATENT DOCUMENTS

| | | | |
|---|---|---|---|
| 2005/0042988 A1* | 2/2005 | Hoek et al. ...................... | 455/69 |
| 2005/0260954 A1 | 11/2005 | Hamalainen et al. | |
| 2007/0133707 A1 | 6/2007 | Hwang et al. | |
| 2009/0034639 A1 | 2/2009 | Hwang et al. | |
| 2009/0086648 A1* | 4/2009 | Xu et al. ...................... | 370/252 |
| 2009/0316807 A1 | 12/2009 | Kim et al. | |
| 2010/0046445 A1 | 2/2010 | Sawahashi et al. | |

FOREIGN PATENT DOCUMENTS

| | | |
|---|---|---|
| CN | 1585296 A | 2/2005 |
| CN | 101529738 A | 9/2009 |
| JP | 2007-214759 A | 8/2007 |
| JP | 2009-273186 A | 11/2009 |
| JP | 2009-278660 A | 11/2009 |
| KR | 10-2008-0094056 | 10/2008 |
| WO | WO 2006/052058 A2 | 5/2006 |
| WO | WO 2007/119451 A1 | 10/2007 |
| WO | WO 2008/024462 A2 | 2/2008 |
| WO | WO 2009/074880 A2 | 6/2009 |
| WO | WO 2009/099151 A1 | 8/2009 |

OTHER PUBLICATIONS

International Search Report for PCT/CN2010/080665 dated Mar. 31, 2010.

* cited by examiner

*Primary Examiner* — Adolf Dsouza
(74) *Attorney, Agent, or Firm* — Fay Sharpe LLP (57) ABSTRACT

A method for selecting antenna elements at a base station can include selecting multiple transmit antenna elements from several antenna elements according to a work mode of the base station. The work mode can be an open-loop or a closed-loop working mode. In open-loop mode the base station does not receive feedback information regarding channel quality from a mobile station. In closed-loop mode feedback information is received. For example, for control signaling, or when the speed of a mobile station is very high, the base station may determine that the working mode is open-loop. When the information being transmitted is data for a specific mobile station and the mobile station is moving at a speed under a threshold, the base station may select or determine the working mode to be the closed-loop working mode. Antenna elements are selected, for example, according to a spatial correlation appropriate to the work mode.

13 Claims, 2 Drawing Sheets

METHOD AND DEVICE FOR SELECTING ANTENNAS AT THE BASE STATION

FIELD OF THE INVENTION

The present invention relates to communication networks, especially to the method and device for selecting the antennas at the base station.

BACKGROUND OF THE INVENTION

In a Multiple Input Multiple Output (MIMO) system, the base station transmits signals using multiple antennas, namely, Multi-antenna transmission is implemented at the base station. Multi-antenna transmission may be classified into open-loop and closed-loop according to whether the base station needs feedback information of the down link. An open-loop Multi-antenna transmission refers to that the transmitter sends signals without knowing the channel state in advance, which typically is that each antenna transmits with the same power, the advantage thereof lies in that, the system is more simple, and the performance is not influenced by the channel feedback; while the shortcoming lies in that, the channel information is not fully used. While a closed-loop transmission is that, the channel state of the down link is fed back to the base station by the mobile station, the base station calculates the weighted coefficient of each mobile station according to the feedback information, to optimize the match between the transmitting wave and the channel state. However, the accuracy and the time delay of the feedback of closed-loop method are highly required, if the speed of the channel changing is higher than the feedback speed of the mobile end, the optimal weighted coefficient of the antenna will not be updated in time. Therefore, the most serious challenge faced by the closed-loop MIMO technique is the acquisition of accurate channel state information at the transmitter (CSIT).

The most popular existing feedback solution for the closed-loop MIMO is the codebook-based feedback solution. The codebook-based feedback is not affected by the asymmetry between the uplink channel and the downlink channel, and is applicable for the TDD and FDD system. Another feedback solution that is based on sounding is only applicable for the TDD system, and suffers severely from the asymmetry between the uplink channel and the downlink channel. Therefore, codebook based solution is the most popular feedback solution in the existing system. However, it suffers from two major issues: the large feedback overhead and inaccuracy of CSIT due to feedback quantization, delay, etc.

The spatial correlation of the antenna, namely, the correlation between the channels corresponding to the antenna, is closely related to the scattering transmission (including the scattering objects in the space) and the character of the antenna. The spatial correlation of the antenna also reflects the orientation of the channel, i.e., the level of independency of each sub-channel. The stronger the spatial correlation of the channel is, the more concentrating on its statistic orientation the distribution of the channel array is, thus only the information of the statistic orientation needs to be fed back; on the contrary, if the spatial correlation of the antenna is very weak, the channel array shows no orientation, and the distribution in the space is average, therefore, large quantity of feedback will be needed if the information of the channel whose spatial correlation is very weak needs to be reflected accurately.

Furthermore, in the current solution using cross-polarization, closely spaced cross-polarized antenna elements are applied. On the one hand, the closely placed antenna elements provide strong spatial correlation; on the other hand, each antenna element has two polarization directions that are perpendicular to each other, for example horizontal polarization and vertical polarization, therefore, each antenna element provides un-correlated polarization directions, and may work as two virtual antennas that are spatially un-correlated. By transmitting signals over the two polarization directions, a virtual un-correlated MIMO system can be constructed. However, the disadvantage of this solution is that the achievable degree of freedom of this virtual un-correlated MIMO system is limited to two.

SUMMARY OF THE INVENTION

In the traditional research, it is believed that, the spatial correlation of the channels is harmful for the MIMO system. However, the resent research has shown that strong spatial correlation is a promising solution to the CSIT acquisition problem due to the following reasons:

1. When the spatial correlation is sufficiently strong, which means the orientation of the channel array is very strong, and the jitter in the time domain or the frequency domain is slight, therefore, the mobile station only needs to feedback the statistical channel information instead of the instantaneous channel information, which leads to both greatly reduced feedback overhead and increased robustness against feedback delay.

2. Due to the limitation of the feedback information, the information fed back by the mobile station is typically quantized, therefore quantization error is introduced. However, under the circumstance that the spatial correlation is strong, no information of the jitter in the time domain or the frequency domain is needed, thereby the number of bits of the feedback can be reduced, namely, under a certain number of bits of the feedback, the strong spatial correlation can reduce the quantization error if a codebook that accurately matches the channel is chosen.

One disadvantage of strongly spatially correlated base station (BS) antenna arrays is a reduced degree of freedom (DoF). In the MIMO system, the DoF of the system is increased by multi-antenna transmitting/receiving. If the path gain fading between each transmitting-receiving antenna pair is independent, multiple parallel spatial sub-channels are constructed. With these sub-channels sending different information streams between each other, the data transmission rate will be increased accordingly, thus the spatial multiplexing is introduced. On the other hand, MIMO system may be used to implement spatial diversity, so as to withstand the channel fading. The communication system increases the reliability of the wireless link by providing diversity gain, the basic idea of which is to provide the receiver with the multiple independent fading copies of the information symbols, so that the possibility for all the signal components to experience simultaneously a deep fading decreased. To be concluded, high DoF can introduce spatial diversity gain and/or spatial multiplexing gain, on the contrary, low DoF means low multiplexing gain or diversity gain. For example, when spatial correlation between the BS antennas is very strong, the propagation matrix between the BS and any mobile stations will be very ill-conditioned. For example, the second largest eigenvalue of the correlation matrix of the propagation matrix is very small, even zero, thus, the multiplexing gain remains at one no matter how many antennas are used at the BS.

However, this problem can be easily solved using multi-user techniques. Due to the different locations of the different users, the channel fadings between the antenna array and the different users are independent, i.e., the propagation coefficients of different users are independent to each other, even with a strongly correlated BS antenna array. Then such multi-user diversity gain can be used to compensate the loss of DoF, and the multiplexing gain can be increased by serving multiple users simultaneously, and the multiplexing gain can be increased by serving multiple users simultaneously and using multiuser precoding or beamforming to avoid the inter-user interference Therefore, closed-loop MIMO system may use the strong spatial correlation to acquire the channel information. However, in other scenarios, e.g., when the user's moving speed is very high, the channel information fed back by the user will be inaccurate, or in the transmission of the broadcast signaling information, the closed-loop techniques cannot be used. Under these circumstances, the open-loop transmission is the only option. In the open-loop transmission, it needs to be guaranteed that, multiple antennas provide a large DoF in order to guarantee a high data rate and/or the reliable transmission. Generally speaking, the two factors of DoF and the spatial correlation of the multi-antenna array are mutually restricted. Increasing the DoF decreases the spatial correlation. Thus, under this circumstance, in order to provide the maximum DoF, weak correlated even un-correlated antenna array is required.

Therefore, in different application scenarios, for example, when the base station is working under different working mode, including open-loop mode or closed-loop mode, the corresponding spatial correlation mode is required between transmit antennas of the base station. Sometimes the antenna array with strong correlation is needed, and sometimes antenna array with weak correlation is needed.

According to a first aspect of this invention, a method of transmitting signals in a base station of Multiple Input Multiple Output communication system is provided, wherein, the base station comprises several antenna elements, and the method comprises: selecting multiple transmit antenna elements from the several antenna elements to transmit signals, according to working mode of the base station, wherein, the working mode comprises open-loop working mode or closed-loop working mode.

Preferably, the method can be implemented by the following steps, the base station determines the spatial correlation mode information between the multiple transmit antenna elements according to the working mode; and selects the multiple transmit antenna elements from the several antenna elements to transmit the signal, according to the spatial correlation mode information.

According to a second aspect of this invention, a device for transmitting signals in a base station of Multiple Input Multiple Output communication system is provided, wherein the base station comprises several antenna elements, and the device comprises: a transmitting means, configured to select multiple transmit antenna elements from the several antenna elements to transmit signals, according to working mode of the base station, wherein the working mode comprises open-loop working mode and closed-loop working mode.

Preferably, the device further comprises: a determining means, configured to determine spatial correlation mode information among the multiple transmit antenna elements according to the working mode; a selecting means, configured to select the multiple transmit antenna elements from the several antenna elements to transmit the signal, according to the spatial correlation mode information.

With the solution in this invention, it can adaptively switch between weak correlated (including un-correlated) and the strong correlated antenna array. Large DoF or strong spatial correlation needed by the communication system can be adaptively provided according to the BS working mode, when the base station is working under closed-loop mode, transmit antenna may be selected to satisfy the strong spatial correlation, thereby the feedback overhead is reduced, and the robustness against the feedback delay is increased; under a given number of bits of the feedback, the strong spatial correlation can reduce the quantization error if a codebook that accurately matches the channel is chosen. When the base station is working under open-loop mode, transmit antenna may be selected to satisfy the weak spatial correlation, thereby the spatial DoF is increased, and the diversity and multiplexing gain may be introduced.

Preferably, with the solution in this invention, several antenna elements are chosen from a large array comprising multiple antenna elements at the base station side for using as transmit antennas, for example, selecting 4 antennas from 64 transmit antennas for transmitting signals, due to that an antenna selection scheme is applied, radio frequency units are not needed to be equipped for all the antenna elements in the array, only RF units corresponding to the number of antennas that might be used for the practical signal transmission are needed to be equipped, the cost is thus reduced.

Furthermore, no extra signaling and feedback overhead will be introduced using the solution in this invention, and the solution in this invention is applicable for open-loop working mode, and for closed-loop mode.

For the closed-loop system, the asymmetry between the uplink and downlink channel occurs easily for the instantaneous channel information, and the statistic channel information is more close to the real channel information, thus, the symmetry between the uplink and downlink of the statistic channel information is more than the symmetry of that of the instantaneous channel information. Therefore, with the solution in this invention, the CSIT acquired with the statistic channel information instead of the instantaneous channel information is more accurate.

BRIEF DESCRIPTION OF THE DRAWINGS

By reading the detailed description of the non-restrictive embodiments with reference to the following drawings, other features, objects and advantages of this invention will become apparent.

Wherein, same or similar reference numerals refer to the same or similar steps or means/module.

DETAILED DESCRIPTION OF EMBODIMENTS

Figure 1:
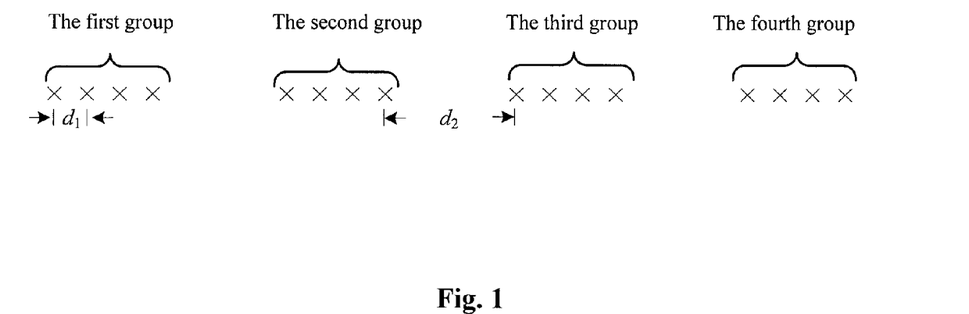
FIG. 1 is a schematic view of the antenna configuration according to one embodiment of the present invention.

FIG. 1 shows a large antenna pool, i.e., a large scale antenna array. Wherein, FIG. 1 shows that the number of the several antenna elements comprised in the base station is 16. The 16 antenna elements are divided into four groups, each with 4 antenna elements. The antenna elements within the same group are closely placed with a spacing of $d_1 < 0.5\lambda$ between any two adjacent antenna elements, wherein, $\lambda$ is the working wave length. Different groups are separated by a larger spacing of $d_2 \geq 4\lambda$. The 16 antenna elements shown in FIG. 1 are placed in line. It should be understand by those skilled in the art, the distribution of the antennas in FIG. 1 is merely illustrative, these 16 antenna elements could also be placed in an array, or be distributed in a circle, etc., or in any other distribution manners of the antenna elements.

Figure 2:
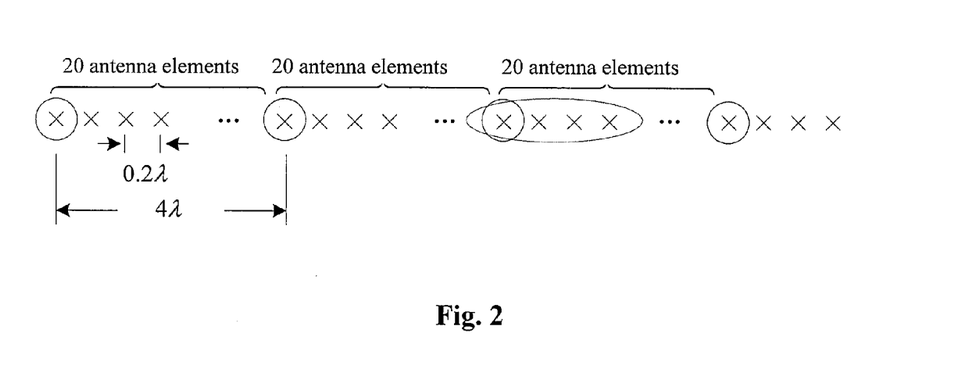
FIG. 2 is a schematic view of the antenna configuration according to one embodiment of the present invention.

FIG. 2 shows a solution of a large antenna pool according to another embodiment of the present invention. Wherein, FIG. 2 shows that the number of the several antenna elements comprised in the base station is 64. The 64 antenna elements are placed in line, with a very small spacing, for example only 0.2λ, between any adjacent elements. It should be understand by those skilled in the art, the spacing of 0.2λ is only illustrative, in the practical antenna configuration, spacing between the BS antennas that is as small as possible could be applied, as long as the spacing between the adjacent antennas is larger than the size of the antenna itself.

In the two embodiments above, the numbers of the antenna elements are 16 and 64 respectively. It should be understand by those skilled in the art, the number of the antenna elements is variable, and is not limited to the numbers used in the two embodiments above.

Figure 3:
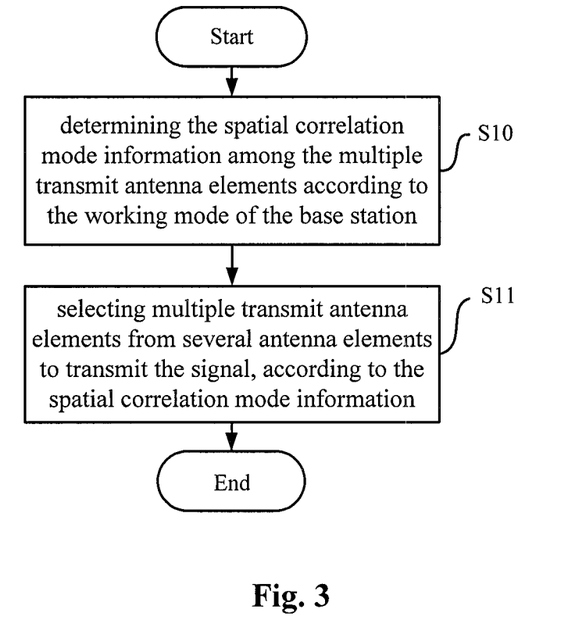
FIG. 3 is a flow chart of the method according to another embodiment of the present invention.

In the followings, a flow chart of the system method according to one embodiment of the present invention will be described referring to FIG. 3.

Firstly, the base station selects multiple transmit antenna elements from the several antenna elements to transmit signals, according to working mode of the base station, wherein, the working mode comprises open-loop working mode or closed-loop working mode. Specifically, the method is further described referring to FIG. 3.

In step S10, base station 1 determines the spatial correlation mode information among the multiple transmit antenna elements according to the working mode of the base station.

The working mode of the base station 1 comprises open-loop working mode or closed-loop working mode. The base station 1 knows what kind of signal it needs to send to the mobile station, for example data or signaling, thus the base station 1 could correspondingly determine using the open-loop working mode or the closed-loop working mode to send this signal. For example, when the base station 1 needs to send control signaling to the mobile station, for example the public control information, since these signals are send in the way of broadcasting, however, the fading experienced by the channels between the base station 1 and the multiple mobile stations are different, there is no way to orientate the transmit signal towards a mobile station using the closed-loop manner, thus the base station typically sends these signaling using open-loop mode. Or, when the moving speed of a mobile station is very high, i.e. when the channel information between the base station and the mobile station is fast time-variant, even if the channel information is fed back to the base station by the mobile station, it is still not accurate. Therefore, for example, when the base station 1 detects that, the moving speed of the mobile station is above a first predetermined threshold, the base station 1 transmits signals to the mobile station with the open-loop working mode.

Furthermore, the base station 1 may apply either the open-loop working mode or the closed-loop working mode during the transmission of data to a specific mobile station. For example, when the base station 1 is transmitting signals to a mobile station whose moving speed is under the first predetermined threshold, for example, the mobile station is in the indoor environment in a big city, the base station 1 may use closed-loop working mode to transmit signals for the mobile station.

Then, the base station 1 determines that the spatial correlation among the transmit antenna elements is strong mode, when the base station is working under the closed-loop working mode, or determines that the spatial correlation among the multiple transmit antenna elements is weak mode, when the base station is working under the open-loop working mode.

The spatial correlation usually can be roughly represented by the rank of the correlation matrix of the propagation matrix, or the ratio between the maximum eigenvalue and the minimum eigenvalue of the correlation matrix of the propagation matrix. For example, if the correlation matrix of the propagation matrix is full rank, the spatial correlation mode among the transmit antennas is weak mode. When the rank of the correlation matrix of the propagation matrix is 1, the spatial correlation mode among the transmit antennas is strong mode. Or when the ratio between the maximum eigenvalue and the minimum eigenvalue of the correlation matrix of the propagation matrix is relative large, the spatial correlation mode among the transmit antennas is strong mode. When the ratio between the maximum eigenvalue and the minimum eigenvalue of the correlation matrix of the propagation matrix is relative small, the spatial correlation mode among the transmit antennas is weak mode.

Then, in step S11, the base station 1 selects multiple transmit antenna elements from several antenna elements, i.e. the large scale antenna array, to transmit the signal, according to the spatial correlation mode information.

Specifically, when the base station 1 determines that the spatial correlation mode among the transmit antenna elements is strong mode, the base station 1 selects multiple transmit antenna elements in which the spacing between any adjacent antennas doesn't exceed a second predetermined threshold, from the large scale antenna array. Specifically, it is described using FIG. 1. as an example. The 16 antenna elements shown in FIG. 1. are divided into four groups, each group with 4 antenna elements, and the spacing between the two adjacent antenna elements among the four antenna elements within the same group is $d_1 < 0.5\lambda$. The base station 1 may set the second predetermined threshold to 0.5λ, so that the base station 1 selects four antenna elements in which the spacing between any adjacent antennas doesn't exceed 0.5λ, to transmit signals. Thus, the base station 1 may select the multiple antenna elements in any group of the four groups to transmit signals, because the spacing between the four antenna elements in one group is minimum, and doesn't exceed 0.5λ, thus, this four antenna elements has a strong spatial correlation in the antenna array consisting of the 16 antenna elements.

In a variant embodiment, using the distribution of antennas shown in FIG. 2 as an example, when the base station 1 determines that the spatial correlation mode among the transmit antenna elements is strong mode, the base station 1 may set the second predetermined threshold to 0.2λ. Thus the base station 1 selects four antenna elements in which the spacing between any adjacent antennas doesn't exceed 0.2λ, to transmit signals. For example, the base station 1 selects four transmit antenna elements in the ellipse circle as shown in FIG. 2. to transmit signals. Under this configuration condition of the base station antenna, the transmit antennas selected by the base station 1 are four adjacent antenna elements, and with a spacing between any adjacent antenna elements doesn't exceed 0.2λ, thus, there exists very strong spatial correlation among these antenna elements.

Therefore, under the closed-loop working mode, the base station 1 selects antenna elements with strong spatial correlation to transmit signals, so that the instantaneous channel information is replaced by the statistic channel information, and the channel information is described more precisely under the condition that a codebook is properly chosen by the mobile station, and the channel information is fed back with less bits, and the quantization error is effectively reduced.

In a variant embodiment, when the base station 1 determines that the spatial correlation mode among the transmit antenna elements is weak mode, the base station 1 selects multiple transmit antenna elements in which the spacing between any adjacent antennas exceeds or equals to a third predetermined threshold from the large scale antenna array. For example, it is still described using FIG. 1 as an example, the base station 1 may set the third predetermined threshold to $4\lambda$ ($\lambda$ is the working wave length). When the base station 1 determines that the spatial correlation mode among the transmit antenna elements is weak mode, the base station 1 selects four antenna elements in which the spacing between any adjacent antennas exceeds $4\lambda$, to transmit signals. For example, the base station 1 may select the first antenna element in each group to transmit signals. Because the four antenna elements selected belongs to different groups, the spacing between the adjacent antenna elements in the selected antenna elements exceeds $4\lambda$, therefore, the spatial correlation among the four antenna elements are the weakest under this antenna configuration, in other words, the channel corresponding to these four antenna elements provides the largest DoF, so as to satisfy the independency of the fading of sub-channels corresponding to these four antenna elements. Therefore, large spatial multiplexing gain and/or spatial diversity gain can be provided, so that the data transmission rate is increased and/or the reliability of the data transmission is increased.

In another variant embodiment, it is described by taking FIG. 2 as an example, the base station 1 may set the third predetermined threshold to $4\lambda$. When the base station 1 determines that the spatial correlation mode among the transmit antenna elements is weak mode, the base station 1 selects four antenna elements in which the spacing between any adjacent antennas exceeds or equals to $4\lambda$ to transmit signals. For example, the base station 1 may select four antenna elements circled by the round circle as shown in FIG. 2. as the transmit antenna, therefore, the spacing between the adjacent antenna elements in the selected antenna elements equals to $4\lambda$. Thus, the spatial correlation between these four antenna elements are the weakest under this antenna configuration, in other words, the channel corresponding to these four antenna elements can provide the largest DoF, so as to satisfy the independency of the fading of sub-channels corresponding to these four antenna elements. Therefore, large spatial multiplexing gain and/or spatial diversity gain can be provided, so that the data transmission rate is increased and/or the reliability of the data transmission is increased.

If the base station 1 would like to acquire a spatial correlation between the strong mode and the weak mode, optionally, the base station may select multiple antenna elements in which the spacing between any adjacent antennas is between the second predetermined threshold and the third predetermined threshold, to transmit signals.

Of course, it should be understand by those skilled in the art, there may be multiple groups of antenna elements satisfying the condition of the predetermined threshold for both FIG. 1 and FIG. 2. For example, it is still described using FIG. 1. as an example, when the base station 1 determines that the spatial correlation mode among the transmit antenna elements is strong mode, the base station 1 selects multiple transmit antenna elements in which the spacing between any adjacent antennas doesn't exceed a second predetermined threshold from the large scale antenna array. The base station 1 may select multiple antenna elements in any group of the four groups to transmit signals. Namely, the base station 1 may select the four antenna elements in the first group to transmit signals, or, may select the four antenna elements in the second group to transmit signals, etc. Therefore, the base station 1 may randomly select one group from these four antenna groups to transmit signals. Optionally, the base station 1 may transmit signals using each antenna group to transmit signals in turn, in a polling manner. It could be understand, the description above is also applicable for the embodiment shown in FIG. 2.

Furthermore, it is still described using FIG. 1. as an example, when the base station 1 determines that the spatial correlation mode among the transmit antenna elements is weak mode, and the base station 1 selects multiple transmit antenna elements in which the spacing between any adjacent antennas exceeds or equals to a third predetermined threshold from the large scale antenna array, the base station 1 may select the first antenna elements in each group of the four groups to transmit signals, or, may select the second antenna elements in each group of the four groups to transmit signals, etc. Of course, the base station 1 may select four antenna elements randomly to transmit signals. Optionally, the base station 1 may apply a polling manner, for example, the corresponding first antenna elements in each group are used to transmit signals in a first time period, the corresponding second antenna elements in each group are used to transmit signals in a second time period, the corresponding third antenna elements in each group are used to transmit signals in a third time period, the corresponding fourth antenna elements in each group are used to transmit signals in a fourth time period, and then such transmission sequence is repeated.

In another variant embodiment, in step S11, when the base station 1 is working under the closed-loop mode, with multiple antenna groups satisfying the threshold condition, for example, when the spacing between the adjacent antenna elements in one selected antenna group is the same as the spacing between the adjacent antenna elements in any other antenna group, and both spacings do not exceed a fourth predetermined threshold, it is still described using FIG. 1. as an example, the fourth predetermined threshold is set to $0.5\lambda$, thus the four antenna elements in each group all satisfy the threshold condition. The step S11 further comprises: the signals being transmitted by the base station 1 in a polling manner, by using each antenna group in the four groups respectively, namely, the base station 1 uses the first antenna group, the second antenna group, the third antenna group and the fourth antenna group in a polling manner to transmit signals. And then, in step S12, the base station 1 receives the feedback information from the mobile station severed by the base station, for example, the mobile station 2 is served by the base station 1, the mobile station 2 determines the antenna group with the highest reliability of receiving according to the acquired signals transmitted by the four antenna groups respectively. For example, if the mobile station 2 measures the Signal to Interference plus Noise Ratio (SINR) of the signal transmitted by the first antenna group is the highest, the mobile station 2 feeds the group number of the first group back to the base station 1. And then, in step 13, the base station 1 determines to use the first antenna group of the four antenna groups to transmit the signal, according to the feedback information, namely the group number of 1.

In the embodiment above, the number of the transmit antennas selected by the base station 1 is four. It can be understand by those skilled in the art, the number of the transmit antennas selected by the base station 1 is not limited thereto. Furthermore, the number of the transmit antennas may be synthetically determined according to the number of the radio frequency circuits of the base station 1 and/or the complexity of the algorithm allowed by the base station 1 and/or the system overhead, for example the overhead introduced by the selection of the pilot signal, and/or the number of the mobile station 2 served by the base station 1. For example, when the complexity of the algorithm allowed by the base station 1 is lower, the number of the selectable antenna elements is smaller than the number of the selectable antenna elements when the complexity of the algorithm allowed by the base station 1 is higher. When the base station 1 serves multiple users, the number of the selected antenna elements may be bigger than the number of the selected antenna elements when a single user is served. Of course, the factor considered during the selection of the number of the transmit antennas is not limited to the factors mentioned above.

In the embodiments above, each antenna element has only one polarization direction, and the polarization directions of each antenna elements are the same. The base station 1 changes the DoF or the correlation among antennas only by selecting antennas with different spacing. Optionally, the base station 1 may work under dual polarized antenna mode, namely cross polarized antenna mode. In a variant embodiment, it is described still using FIG. 1. as an example, each antenna element shown in FIG. 1 has two polarization directions simultaneously. When the base station 1 determines that the spatial correlation mode among the transmit antenna elements is strong mode, the base station 1 selects multiple transmit antenna elements in which the spacing between any adjacent antennas doesn't exceed a second predetermined threshold from the large scale antenna array, and these selected multiple antenna elements use the same single polarization direction.

In a variant embodiment, when the base station 1 determines that the spatial correlation mode among the transmit antenna elements is weak mode, the base station 1 selects multiple transmit antenna elements in which the spacing between any adjacent antennas exceeds a third predetermined threshold from the large scale antenna array, and these selected multiple antenna elements use dual polarization directions. Namely, each antenna uses two polarization directions simultaneously, one is horizontal polarization direction and the other is vertical polarization direction. Two polarization directions may work as two virtual antennas that are spatially un-correlated. Signals are transmitted in these two directions, the effect will similar to two virtual antennas that are un-correlated are used. Therefore, when the transmit antennas all use dual polarization, the number of the antennas that are spatially un-correlated will be doubled.

In the embodiments above, the second predetermined threshold is set to 0.5λ or 0.2λ, the third predetermined threshold is set to 0.5λ, the fourth predetermined threshold is set to 0.2λ, it could be understand that, in the practical system, the values of these thresholds are not limited to the values given in the embodiments mentioned above, those skilled in the art may configure these threshold according to the practical needs, or the base station may adjust these threshold values automatically. Besides, the value of the first predetermined threshold may be set manually or automatically according to the situation of the communication system.

Figure 4:
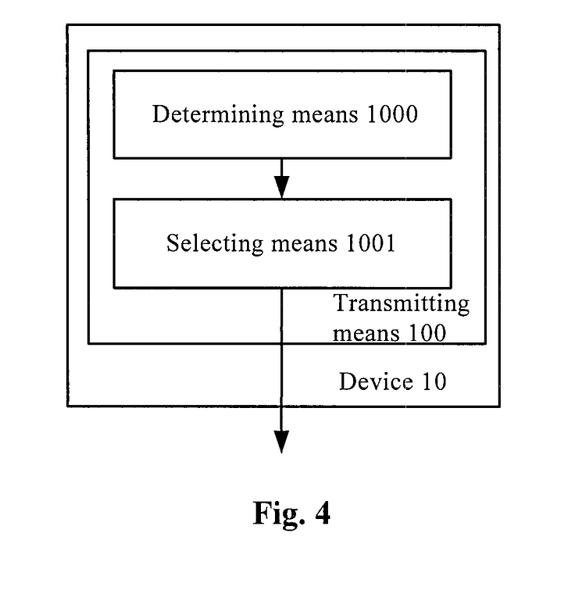
FIG. 4 is a block diagram of the device according to one embodiment of the present invention.

In the followings, referring to FIG. 4, the block diagram of the device according to one embodiment of the present invention is described.

The device 10 shown in FIG. 4 is located in the base station 1. The device 10 comprises a transmitting means 100, which comprises a determining means 1000 and a selecting means 1001.

Firstly, the transmitting means 100 of the base station 1 selects multiple transmit antenna elements from the several antenna elements to transmit signals, according to working mode of the base station, wherein the working mode comprises open-loop working mode and closed-loop working mode. Detailed description will be given in the followings.

The determining means 1000 determines the spatial correlation mode information among the multiple transmit antenna elements according to the working mode of the base station.

The working mode of the base station 1 comprises open-loop working mode and closed-loop working mode. The base station 1 knows what kind of signal it needs to send to the mobile station, for example data or signaling, thus the base station 1 could correspondingly determine using the open-loop working mode or the closed-loop working mode to send this signal. For example, when the base station 1 needs to send control signaling to the mobile station, for example the public control information, since these signals are send in the way of broadcasting, however, the fading experienced by the channels between the base station 1 and the multiple mobile stations are different, there is no way to orientate the transmit signal towards a mobile station using the closed-loop manner, thus the base station 1 typically sends these signaling using open-loop mode. Or, when the moving speed of a mobile station 2 is very high, i.e. when the channel information between the base station 1 and the mobile station 2 is fast time-variant, even if the channel information is fed back to the base station 1 by the mobile station 2, it is still not accurate. Therefore, for example, when the base station 1 detects that, the moving speed of the mobile station 2 is above a first predetermined threshold, the base station 1 transmits signals to the mobile station with the open-loop working mode.

Furthermore, when the base station 1 transmits data to a specific mobile station, the base station 1 may apply either the open-loop working mode or the closed-loop working mode. For example, when the base station 1 is transmitting signals to a mobile station 2 whose moving speed is under the first predetermined threshold, for example, the mobile station 2 is in the indoor environment in a big city, the base station 1 may apply closed-loop working mode to transmit signals for the mobile station 2.

Then, the determining means 1000 determines that the spatial correlation among the transmit antenna elements is strong mode, when the base station is working under the closed-loop working mode, or determines that the spatial correlation among the transmit antenna elements is weak mode, when the base station is working under the open-loop working mode.

The spatial correlation usually can be roughly represented by the rank of the correlation matrix of the propagation matrix, or the ratio between the maximum eigenvalue and the minimum eigenvalue of the correlation matrix of the propagation matrix. For example, if the correlation matrix of the propagation matrix is full rank, the spatial correlation mode among the transmit antennas is weak mode. When the rank of the correlation matrix of the propagation matrix is 1, the spatial correlation mode among the transmit antennas is strong mode. Or when the ratio between the maximum eigenvalue and the minimum eigenvalue of the correlation matrix of the propagation matrix is relative large, the spatial correlation mode among the transmit antennas is strong mode. When the ratio between the maximum eigenvalue and the minimum eigenvalue of the correlation matrix of the propagation matrix is relative small, the spatial correlation mode among the transmit antennas is weak mode.

Then, the selecting means 1001 selects multiple transmit antenna elements from several antenna elements, i.e. the large scale antenna array, to transmit the signal, according to the spatial correlation mode information.

Specifically, when the determining means 1000 determines that the spatial correlation mode among the transmit antenna elements is strong mode, the selecting means 1001 selects multiple transmit antenna elements in which the spacing between any adjacent antennas doesn't exceed a second predetermined threshold from the large scale antenna array. Specifically, it is described using FIG. 1. as an example. The 16 antenna elements shown in FIG. 1. are divided into four groups, each group with 4 antenna elements, and the spacing between the two adjacent antenna elements among the four antenna elements within the same group is $d_1 < 0.5\lambda$. The base station 1 may set the second predetermined threshold to $0.5\lambda$, so that the selecting means 1001 selects four antenna elements in which the spacing between any adjacent antennas doesn't exceed $0.5\lambda$ to transmit signals. Thus, the selecting means 1001 may select the multiple antenna elements in any group of the four groups to transmit signals, because the spacing between the four antenna elements in one group is minimum, and doesn't exceed $0.5\lambda$, thus, there exists strong spatial correlation among these antenna elements.

In a variant embodiment, using the distribution of antennas shown in FIG. 2 as example, when the determining means 1000 determines that the spatial correlation mode among the transmit antenna elements is strong mode, the base station 1 may set the second predetermined threshold to $0.2\lambda$. Thus the selecting means 1001 selects four antenna elements in which the spacing between any adjacent antennas doesn't exceed $0.2\lambda$, to transmit signals. For example, the selecting means 1001 selects four transmit antenna elements in the ellipse circle as shown in FIG. 2. to transmit signals. Under the configuration condition of the base station antenna, the transmit antennas selected by the selecting means 1001 are four adjacent antenna elements, and with a spacing between any adjacent antenna elements doesn't exceed $0.2\lambda$, thus, there exists very strong spatial correlation among these antenna elements.

Therefore, under the closed-loop working mode, the selecting means 1001 selects antenna elements with strong spatial correlation to transmit signals, so that the instantaneous channel information is replaced by the statistic channel information, and the channel information is described more precisely under the condition that a codebook is properly chosen by the mobile station, and the channel information is fed back with less bits, and the quantization error is effectively reduced.

In a variant embodiment, when the determining means 1000 determines that the spatial correlation mode among the transmit antenna elements is weak mode, the selecting means 1001 selects multiple transmit antenna elements in which the spacing between any adjacent antennas exceeds or equals to a third predetermined threshold from the large scale antenna array. For example, it is still described using FIG. 1 as an example, the base station 1 may set the third predetermined threshold to $4\lambda$ ($\lambda$ is the working wave length). When the determining means 1000 determines that the spatial correlation mode among the transmit antenna elements is weak mode, the selecting means 1001 selects four antenna elements in which the spacing between any adjacent antennas exceeds $4\lambda$ to transmit signals. For example, the base station 1 may select the first antenna element in each group to transmit signals. Because the four antenna elements selected belongs to different groups, the spacing between the adjacent antenna elements in the selected antenna elements exceeds $4\lambda$, therefore, the spatial correlation among the four antenna elements are weakest under this antenna configuration, in other words, the channel corresponding to these four antenna elements provides the largest DoF, so as to satisfy the independency of the fading of sub-channels corresponding to these four antenna elements. Therefore, large spatial multiplexing gain and/or spatial diversity gain can be provided, so that the data transmission rate is increased and/or the reliability of the data transmission is increased.

In another variant embodiment, it is described by taking FIG. 2 as an example, the base station 1 may set the third predetermined threshold to $4\lambda$. When the determining means 1000 determines that the spatial correlation mode among the transmit antenna elements is weak mode, the selecting means 1001 selects four antenna elements in which the spacing between any adjacent antennas exceeds or equals to $4\lambda$ to transmit signals. For example, the selecting means 1001 may select four antenna elements circled by the round circle as shown in FIG. 2. as the transmit antenna, therefore, the spacing between the adjacent antenna elements in the selected antenna elements equals to $4\lambda$. Thus, the spatial correlation among these four antenna elements are weakest under this antenna configuration, in other words, the channel corresponding to these four antenna elements can provide the largest DoF, so as to satisfy the independency of the fading of sub-channels corresponding to these four antenna elements. Therefore, large spatial multiplexing gain and/or spatial diversity gain can be provided, so that the data transmission rate is increased and/or the reliability of the data transmission is increased.

Of course, it should be understand by those skilled in the art, there may be multiple groups of antenna elements satisfying the condition of the predetermined threshold for both FIG. 1 and FIG. 2. For example, it is still described using FIG. 1. as example, when the determining means 1000 determines that the spatial correlation mode among the transmit antenna elements is strong mode, the selecting means 1001 selects multiple transmit antenna elements in which the spacing between any adjacent antennas doesn't exceed a second predetermined threshold from the large scale antenna array, and the selecting means 1001 may select multiple antenna elements in any group of the four groups to transmit signals. Namely, the selecting means 1001 may select the four antenna elements in the first group to transmit signals, or, may select the four antenna elements in the second group to transmit signals, etc. Therefore, the selecting means 1001 may randomly select one group from these four antenna groups to transmit signals. Optionally, the selecting means 1001 may transmit signals using each antenna group in turn, in a polling manner.

Furthermore, when the determining means 1000 determines that the spatial correlation mode among the transmit antenna elements is weak mode, and the selecting means 1001 selects multiple transmit antenna elements in which the spacing between any adjacent antennas exceeds or equals to a third predetermined threshold from the large scale antenna array, the selecting means 1001 may select the first antenna elements in each group to transmit signals, or, may also select the second antenna elements in each group to transmit signals, etc. Of course, the selecting means 1001 may select four antenna elements randomly to transmit signals. Optionally, the selecting means 1001 may apply a polling manner, for example, the corresponding first antenna elements in each group are used to transmit signals in a first time period, the corresponding second antenna elements in each group are used to transmit signals in a second time period, the corresponding third antenna elements in each group are used to transmit signals in a third time period, the corresponding fourth antenna elements in each group are used to transmit signals in a fourth time period, and then such transmission sequence is repeated.

In another variant embodiment, when the base station 1 is working under the closed-loop mode, with multiple antenna groups satisfying the threshold condition, for example, when the spacing between the adjacent antenna elements in one selected antenna group is the same as the spacing between the adjacent antenna elements in any other antenna group, and both spacings do not exceed a fourth predetermined threshold, it is still described using FIG. 1. as an example, the fourth predetermined threshold is set to 0.5λ, thus the four antenna elements in each group satisfy the threshold condition. The signals are transmitted by the transmitting means 100 in a polling manner, by using each antenna group in the four groups respectively, And then, a receiving means (not shown) receives the feedback information from the mobile station severed by the base station, for example, the mobile station 2 is served by the base station 1, the mobile station 2 determines the antenna group with the highest reliability of receiving according to the acquired signals transmitted by the four antenna groups respectively. For example, if the mobile station 2 measures the SINR of the signal transmitted by the first antenna group is the highest, the mobile station 2 feeds the group number of the first group back to the base station 1. And then, the selecting means 1001 determines to use the first group of the four antenna groups to transmit the signal, according to the feedback information, namely the group number of 1.

In the embodiment above, the number of the transmit antennas selected by the base station 1 is four. It can be understand by those skilled in the art, the number of the transmit antennas selected by the base station 1 is not limited thereto. Specifically, the number of the transmit antennas may be synthetically determined according to the number of the RF circuits of the base station 1 and/or the complexity of the algorithm allowed by the base station 1 and/or the system overhead, for example the overhead introduced by the selection of the pilot signal, and/or the number of the mobile station 2 served by the base station 1. For example, when the complexity of the algorithm allowed by the base station 1 is lower, the number of the selectable antenna elements is smaller than the number of the selectable antenna elements when the complexity of the algorithm allowed by the base station 1 is higher. When the base station 1 serves multiple users, the number of the selected antenna elements may be bigger than the number of the selected antenna elements when a single user is served. Of course, the factor considered during the selection of the number of the transmit antennas is not limited to the factors mentioned above.

In the embodiments above, each antenna element has only one polarization direction, and the polarization directions of each antenna elements are the same. The selecting means 1001 changes the DoF or the correlation among antennas only by selecting antennas with different spacing. Optionally, the solution may work under dual polarized antenna mode, namely cross polarized antenna mode. In a variant embodiment, it is described still using FIG. 1 as an example, each antenna element shown in FIG. 1 has two polarization directions simultaneously. When the determining means 1000 determines that the spatial correlation mode among the transmit antenna elements is strong mode, the selecting means 1001 selects multiple transmit antenna elements in which the spacing between any adjacent antennas doesn't exceed a second predetermined threshold from the large scale antenna array, and these selected multiple antenna elements use the same single polarization direction.

In a variant embodiment, when the determining means 1000 determines that the spatial correlation mode among the transmit antenna elements is weak mode, the selecting means 1001 selects multiple transmit antenna elements in which the spacing between any adjacent antennas exceeds or equals to a third predetermined threshold from the large scale antenna array, and these selected multiple antenna elements use dual polarization directions.

Namely, each antenna uses two polarization directions simultaneously, one is horizontal polarization direction and the other is vertical polarization direction. Two polarization directions may work as two virtual antennas that are spatially un-correlated. If signals are transmitted in these two directions, the effect will be similar to two virtual antennas that are un-correlated are used. Therefore, when the transmit antennas all use dual polarization, the number of the antennas that are spatially un-correlated will be doubled.

The embodiments of the present invention have been described above, but the present invention is not limited to a specific system, equipment and specific protocol, those skilled in the art may make variation and modification within the scope of the claims appended.

Those skilled in the art may understand and implement other alterations in the enclosed embodiments, by reading the description, the disclosure, the drawings and the appended claims. In the claims, the word "comprise" doesn't exclude the presence of other elements or steps, and the word "a" or "an" doesn't exclude the presence of "multiple" such elements. In the practical application of this invention, one component may execute functions of multiple technical features in the claims. Any reference numerals in the claims shouldn't be considered as limitation to the scope.

The invention claimed is:

1. A method of transmitting signals in a base station of Multiple Input Multiple Output communication system, wherein the base station comprises several antenna elements, and the method comprises:

selecting multiple transmit antenna elements from the several antenna elements to transmit signals according to a working mode of the base station, wherein, the working mode comprises an open-loop working mode or a closed-loop working mode by determining spatial correlation mode information among the multiple transmit antenna elements according to the working mode and selecting the multiple transmit antenna elements from the several antenna elements to transmit the signal according to the spatial correlation mode information.

2. The method according to claim 1, wherein before the selecting of the multiple transmit antenna elements the method further comprises:

determining that the base station is working under the open-loop mode, when the traffic type of the signal being transmitted by the base station is signaling, and/or when the moving speed of a mobile station served by the base station is above a first predetermined threshold.

3. The method according to claim 1, wherein the determining of the spatial correlation mode information is implemented by:

determining that the spatial correlation among the multiple transmit antenna elements is strong mode when the base station is working under the closed-loop mode; and determining that the spatial correlation among the multiple transmit antenna elements is weak mode when the base station is working under the open-loop mode.

4. The method according to claim 3, wherein the selecting of the multiple transmit antenna elements is implemented by:

selecting the multiple transmit antenna elements in which the spacing between any adjacent antennas does not exceed a second predetermined threshold, from the several antenna elements, when the spatial correlation among the multiple transmit antenna elements is strong mode; and selecting the multiple transmit antenna elements in which the spacing between any adjacent antennas exceeds or equals to a third predetermined threshold, from the several antenna elements, when the spatial correlation among the multiple transmit antenna elements is weak mode.

5. The method according to claim 4, wherein at least one of the several antenna elements has cross polarization directions and wherein the selecting of the multiple transmit antenna elements from the several antenna elements to transmit the signal, according to the spatial correlation mode information is further implemented by:

the multiple transmit antenna elements using the same single polarization direction when the spatial correlation among the multiple transmit antenna elements is strong mode; and the multiple transmit antenna elements using dual polarization directions when the spatial correlation among the multiple transmit antenna elements is weak mode.

6. The method according to claim 1, wherein when the base station is working under the closed-loop mode and the multiple transmit antenna elements belong to multiple antenna groups, the spacing between the adjacent antenna elements in one antenna group is the same as the spacing between the adjacent antenna elements in any other antenna group, and both spacings do not exceed a fourth predetermined threshold, the selecting of the multiple transmit antenna elements from the several antenna elements to transmit the signal, according to the spatial correlation mode information is implemented by:

selecting the multiple antenna groups from the several antenna elements according to the spatial correlation mode information;

transmitting signals using each antenna group in a polling manner;

and after the selecting of the multiple transmit antenna elements from the several antenna elements to transmit the signal, according to the spatial correlation mode information:

receiving feedback information from a mobile station served by the base station;

determining to transmit the signal using one antenna group of the multiple antenna groups according to the feedback information.

7. The method according to claim 4, wherein the number of the multiple transmit antenna elements is determined according to the number of the radio frequency circuits of the base station and/or the complexity of the algorithm of the base station and/or the system overhead and/or the number of the mobile station served by the base station.

8. The method according to claim 4, wherein the second predetermined threshold is half working wave length, and/or the third predetermined threshold is four times working wave length.

9. The method according to claim 6, wherein the fourth predetermined threshold is half working wave length.

10. A device for transmitting signals in a base station of Multiple Input Multiple Output communication system, wherein the base station comprises several antenna elements, and the apparatus comprises:

at least one processor; and a transmitter;

wherein at least one of the at least one processor is configured to select multiple transmit antenna elements from the several antenna elements to transmit signals according to a working mode of the base station, wherein the working mode comprises one of an open-loop working mode and a closed-loop working mode and wherein the at least one processor is configured as:

a determiner, configured to determine spatial correlation mode information among the multiple transmit antenna elements according to the working mode; and a selector, configured to select the multiple transmit antenna elements from the several antenna elements to transmit the signals, according to the spatial correlation mode information.

11. The device according to claim 10, wherein the at least one processor configured as the determiner is configured to:

determine that the spatial correlation among the multiple transmit antenna elements is strong mode when the base station is working under the closed-loop mode; and determine that the spatial correlation among the multiple transmit antenna elements is weak mode when the base station is working under the open-loop mode.

12. The device according to claim 11, wherein the at least one processor configured as the selector is further configured to:

select the multiple transmit antenna elements in which the spacing between any adjacent antennas does not exceed a second predetermined threshold, from the several antenna elements, when the spatial correlation among the multiple transmit antenna elements is strong mode; and select the multiple transmit antenna elements in which the spacing between any adjacent antennas exceeds or equals to a third predetermined threshold, from the several antenna elements, when the spatial correlation among the multiple transmit antenna elements is weak mode.

13. The device according to claim 12, wherein at least one of the several antenna elements has cross polarization directions, the at least one processor configured as the selector is further configured for:

enabling the multiple transmit antenna elements to use the same single polarization direction, when the spatial correlation among the multiple transmit antenna elements is strong mode; and enabling the multiple transmit antenna elements to use dual polarization directions, when the spatial correlation among the multiple transmit antenna elements is weak mode.

* * * * *